United States Patent [19]

Rines et al.

[11] Patent Number: 4,662,726

[45] Date of Patent: May 5, 1987

[54] REFLECTIVE OPTICAL ELEMENT

[75] Inventors: Glen A. Rines, Amherst, N.H.; John D. Kuppenheimer, Jr., Tewksbury, Mass.

[73] Assignee: Sanders Associates, Inc., Nashua, N.H.

[21] Appl. No.: 907,129

[22] Filed: Sep. 15, 1986

Related U.S. Application Data

[63] Continuation of Ser. No. 556,878, Dec. 1, 1983, abandoned.

[51] Int. Cl.$^4$ .......................... G02B 17/00; G02B 5/10
[52] U.S. Cl. ................................... 350/444; 350/442; 350/443; 350/620
[58] Field of Search ............... 350/441, 442, 443, 444, 350/614, 620

[56] References Cited

U.S. PATENT DOCUMENTS 3,998,532 12/1976 Dykes ................................. 350/441
4,012,126 3/1977 Rosendahl et al. ................. 350/443
4,554,448 11/1985 Sillitto ............................... 350/444

FOREIGN PATENT DOCUMENTS 125374 6/1878 France.

Primary Examiner—John K. Corbin
Assistant Examiner—P. M. Dzierzynski
Attorney, Agent, or Firm—Richard I. Seligman

[57] ABSTRACT

An optical element includes an ogival reflective surface which diverges an incident radiant energy beam substantially uniformly into a $2\pi$ solid angle. The precise shape of the reflective surface is defined mathematically in relation to the desired solid angle of divergence and energy distribution of the incident beam. To facilitate mounting and alignment of the reflective surface in an optical system, it is formed internally of a body of optically transmissive material. The external surface of the transmissive body is shaped so as to provide normal incidence for rays reflected from the reflective surface. The element may be used as a beam diverger, or alternatively in reverse, to converge and collimate radiation.

12 Claims, 5 Drawing Figures

REFLECTIVE OPTICAL ELEMENT

This application is a continuation of application Ser. No. 556,878, now abandoned, filed Dec. 1, 1983.

BACKGROUND OF THE INVENTION

This invention relates generally to optics and, more particularly, to optical elements utilized to diverge collimated or nearly collimated beams of radiant energy into a predetermined solid angle (e.g., $2\pi$ steradians), or alternatively, to converge or collimate radiant energy from solid angle image fields.

Various applications in optics and the like require that a beam of radiant energy, such as that emitted by a laser, be diverged uniformly into a $2\pi$ solid angle, or hemisphere. For example, remote optical controllers and similar such systems often require that a radiant energy beam be directed to an object or target whose location is not pin-pointed relative to the source of the beam, and may vary anywhere within a $2\pi$ solid angle of the beam axis.

This divergence is usually accomplished utilizing so-called "fish-eye" or wide angle diverger lens systems. These systems typically comprise a plurality of negative lens elements, spaced apart from one another and aligned on a common optical axis. A beam of radiant energy which is incident on the system along the common optical axis is progressively diverged by each lens element, with the final divergence into the $2\pi$ solid angle being effected by the last lens element in the system.

Because lens systems of this type are relatively expensive to manufacture and thus high in cost, they are impractical for use in many applications where substantial cost constraints exist. Additionally, since the beam is progressively diverged by each lens element in such a system, the last lens element must have a cross-sectional size that is relatively large in comparison to the initial beam size to accommodate the divergence effected by the earlier lens elements in the system. Thus, these systems can also be impractical for use in applications where the size and/or weight of the optical elements must be kept to a minimum.

In view of the above, it is a primary object of the present invention to provide an improved optical element capable of diverging a radiant energy beam into a predetermined solid angle.

Another object of the invention is to provide an optical element of the above-described type which is relatively inexpensive to manufacture and low in cost.

Another object of the invention is to provide an optical element of the above-described type which can be made relatively light in weight and relatively small in size in relation to the beam which it diverges.

Another object of the invention is to provide an optical element of the above-described type which is easy to mount and align within an optical system.

Still another object of the invention is to provide an optical element of the above-described type which, due to the principle of reversability, can be used in reverse to converge or collimate radiant energy from a solid angle image field.

Other objects of the invention will in part appear, and in part be obvious from, the detailed description which follows.

SUMMARY OF THE INVENTION

The present invention is based upon the recognition that the desired beam divergence can be effected by a cylindrically symmetrical, generally ogivally shaped, reflective surface which is disposed within the beam path. The precise shape of the reflective surface is mathematically definable in terms of that which will send a collimated beam of radiant energy incident along its axis into rays distributed within a predetermined solid angle (e.g., $2\pi$ steradians) measured from a plane normal to the axis. To facilitate mounting and alignment of the reflective surface within an optical system, it is formed as part of an optical element internally of a body of optically transmissive material. The shape of the external surface of the transmissive body which surrounds the reflective surface is selected so that it is disposed at normal incidence to each ray reflected from the reflective surface. As a result of this configuration, refractive bending and Fresnel reflection losses are minimized at the body/ambient interface. A beam of radiant energy which is made incident on the element, parallel to its axis, is thus diverged by its reflective surface into rays which are distributed within the desired solid angle. Unlike the situation with conventional wide angle lens systems, the overall cross section and length of the element need be only slightly larger than the cross section of the beam which it diverges. The element can thus be made relatively compact and small in size.

The reflective surface may take a variety of forms. In one embodiment, the reflective surface is formed by a metallic ogival member mounted internally of the transmissive body. In another embodiment, the reflective surface is formed by an ogival cavity within one end of the transmissive body which is coated with a reflective metallic layer. In still another embodiment, the reflective surface is formed by an ogival cavity within one end of the transmissive body, with the index of refraction of the body material being selected so that total internal reflection takes place at the dielectric interface between the ogival cavity surface and the medium that occupies the cavity. Whatever form of reflective surface is used, the optical element of the invention can be fabricated relatively inexpensively and in large quantities using conventional casting, molding and/or machining procedures. The production costs of the element should thus be substantially less than those of conventional wide angle lens systems used for the same purpose.

The optical element of the invention may be used to diverge a beam of radiant energy into a desired solid angle, as discussed above, or alternatively in reverse, to converge or collimate radiant energy from a solid angle image field to a small area beam size. It should thus prove to be a useful substitute for conventional wide angle lens systems, particularly in those applications where the cost, size and/or weight of the optics must be kept to a minimum.

BRIEF DESCRIPTION OF THE DRAWINGS

The foregoing and other objects, features and advantages of the invention will be better understood by reference to the following detailed description taken in conjunction with the accompanying drawing in which.

DETAILED DESCRIPTION OF THE ILLUSTRATIVE EMBODIMENTS

1. Theory

Before proceeding with a description of the various illustrative embodiments of the invention, it is useful first to discuss the theory upon which the concept of the invention is based.

As noted above, an optical element in accordance with the invention includes a reflective surface whose shape is characterized in that it will disperse a collimated radiant energy beam incident upon it throughout a desired solid angle, e.g., $2\pi$ steradians, preferably with uniform radiant energy intensity within each increment of solid angle. To facilitate the mounting and alignment of this reflective surface in an optical system, it is formed internally of a body of optically transmissive material. The external surface of the transmissive body which extends about the reflective surface is characterized in that it is disposed at normal incidence to each ray reflected from the reflective surface so as to avoid refractive bending and minimize Fresnel reflection losses at the body/ambient interface.

The optical element of the invention is thus characterized by two arcuate surfaces, whose shapes are driven by different requirements, since they perform different functions, but are not independent of one another. The shape of the reflective surface is, in fact, controlling, since its specific geometry is determined by the diameter and irradiance (i.e., energy) distribution of the incident radiant energy beam and the desired divergence angle. The specific geometry of the reflective surface, in turn, determines a unique solution for the shape of the external surface which will provide normal incidence for the rays reflected from the reflective surface.

A logical approach, therefore, to achieving a total solution for the shapes of the two arcuate surfaces in an optical element of the invention is first to generate a solution for the reflective surface and then to generate a solution for the external surface beginning with the intersection of these two surfaces. The intersection of the two surfaces provides a boundary condition where both the coordinate position and slope of both surfaces are known. A solution for the case of a $2\pi$ solid angle of divergence is set forth below.

Figure 1:
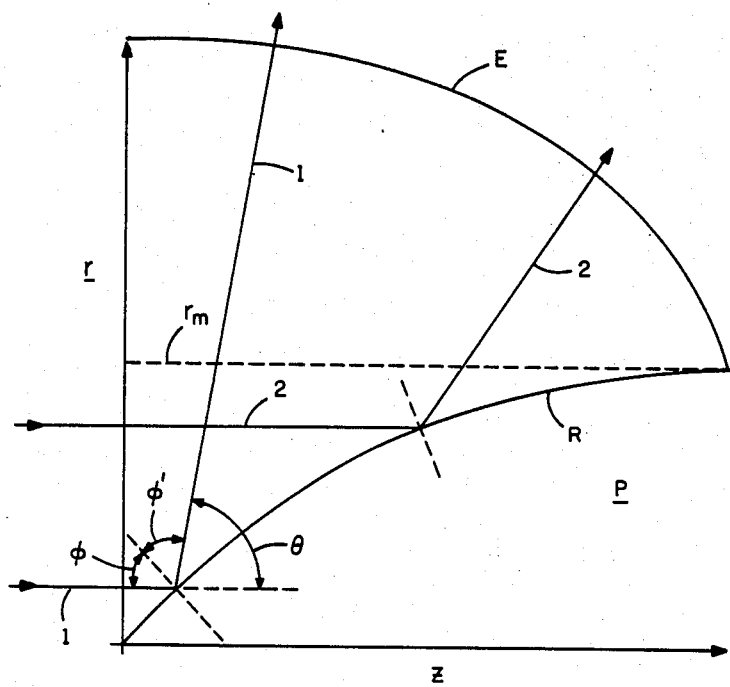
FIG. 1 is a diagram utilized in the derivation of a mathematical relation for defining the shape of a reflective surface in an optical element embodied in accordance with the invention.

FIG. 1 of the drawing shows a two dimensional section taken along a typical quadrant plane P in an optical element of the invention, and gives the coordinates used for the calculations which follow. Curve R in FIG. 1 corresponds to the intersection of the reflective surface of the optical element with the plane P, while curve E corresponds to the intersection of the external surface of the element with the plane P. The incident radiant energy beam used to define the reflective surface is assumed to propagate along the positive z axis in FIG. 1. The energy distribution H of the incident beam is also assumed to be symmetrical with respect to the z axis, so that H is a function of the orthogonal coordinate r only. This allows us to assume a cylindrical symmetry for the optical element and to reduce the problem to planar coordinates (r, z). Curve R is thus a generatrix whose revolution about the axis z defines the reflective surface of the optical element. Similarly, curve E is a generatrix whose revolution about the z axis defines the external surface of the element.

In FIG. 1, the lines labeled 1 and 2 represent two sample ray lines of the incident beam within the plane P. Each of these lines 1 and 2 is initially parallel to the z axis, and is reflected at the reflective surface represented by the curve R so that it propagates at an angle $\theta$ with respect to the z axis. The law of reflection applies to each such ray, so that $\phi = \phi'$. Geometry requires that $$\phi + \phi + \theta = \pi \tag{1}$$

or $$\phi = \frac{\pi - \theta}{2} \tag{2}$$

Looking at z as the independent variable in FIG. 1, then the slope of the curve R is $dr/dz$, and its angle with respect to the z axis is $\tan^{-1} dr/dz$. The normal to the curve R is $\tan^{-1} dr/dz + \pi/2$. By geometry, $$\tan^{-1}\frac{dr}{dz} + \frac{\pi}{2} = \pi - \phi \tag{3}$$

From equation (2) above, $$\tan^{-1}\frac{dr}{dz} + \frac{\pi}{2} = \pi - \left(\frac{\pi - \theta}{2}\right) \tag{4}$$

Thus, $$\theta = 2\tan^{-1}\frac{dr}{dz} \tag{5}$$

Integrating equation (5), the following general expression for the curve R is obtained $$z = -\int_0^{r_m} \frac{dr}{\tan\theta/2} \tag{6}$$

where $r_m$ is the maximum radius of the incident beam.

The value of $\theta$ in equation (6) above is itself a function of the desired solid angle divergence and of the energy distribution H of the incident beam, which, as noted, is a function of r. If we assume, as discussed above, that the desired solid angle is $2\pi$ steradians and that the radiant energy intensity is uniform for each increment of solid angle into which the incident beam is dispersed, we derive the following expression for $$\cos\theta = \frac{2\pi}{P} \int_0^r H(r)r\,dr \tag{7}$$

where P is the total power of the incident beam.

It can thus be appreciated from the above that the solution to equation (6) depends upon the particular mathematical model used to describe the energy distribution H(r) of the incident beam. The simplest case is one in which the energy distribution is assumed to be constant across the beam radius, thus $H(r) = H_0$. For this case, we obtain the following expression for $\theta$ $$\theta = \cos^{-1}\left(\frac{r}{r_m}\right)^2 \tag{8}$$

A closer approximation to the energy profile of laser output beams is obtained using a truncated Gaussian beam model of the following form $$H(r) = \alpha e^{-\frac{r^2}{s^2 r_m^2}} \tag{9}$$

where $\alpha$ is the normalization factor and s is a normalized Gaussian parameter which indicates the section of the Gaussian beam profile used to model the energy distribution of the incident beam. Using the truncated Gaussian beam model of equation (9), we obtain the following expression for $\theta$ $$\theta = \cos^{-1}\left[\frac{1}{1 - e^{-1/s^2}} e^{-(r/sr_m)^2}\right] \tag{10}$$

Substituting the respective expressions for $\theta$ of equations (8) and (10) in equation (6), one can readily derive solutions for the curve R for the case of both uniform and truncated Gaussian incident beams.

Using the truncated Gaussian model of equation (9), a solution to equation (6) was obtained by a numerical integration procedure which was implemented on a digital computer. The program used to generate the solution for the curve R employed the well-known trapezoidal rule of integration, to wit:

$$z = \left(\frac{f(r) + f(r + \Delta r)}{2}\right) \Delta r \tag{11}$$

where $\Delta r$ is the radial integration increment which was selectable as an input to the program along with the maximum beam radius $r_m$ and the Gaussian beam model parameter s. The program created a data file containing the coordinate (r, z) and slope values for a plurality of data points along the curve R. A plot file was also created which prepared the data for input to a conventional x-y plotter.

The remaining part of the problem, solving for the shape of the curve E, was done completely with numerical techniques on the computer as follows. Since the values of $\theta$ which emerge from the solution of the curve R determine the slopes of the ray lines reflected from the curve R, each of which line has a specific coordinate position along the curve R, corresponding values of the slope of the curve E could be obtained. Specifically, the slope of each reflected ray line is $\tan\theta$, while the corresponding slope of the curve E which provides normal incidence for each such ray line is $-(\tan\theta)^{-1}$. Since we knew from the solution of the curve R not only the slope of each reflected ray line, but also one point through which the line passed, i.e., the point (r, z) on the curve R corresponding to a given value of $\theta$, we had a complete equation for each reflected ray line. We also knew the slope of the curve E at the point where it is intersected by each reflected ray line, and that the curves E and R had to intersect in the plane P (FIG. 1). A numerical solution of the data points of the curve E could thus be obtained employing the simultaneous solution of known pairs of lines corresponding to each data point calculated for the curve R.

The computer program for generating the solution for the curve E started with the point corresponding to the last calculated (i.e., rightmost in FIG. 1) point on the curve R, since it is at this end point that the curves E and R were known to intersect. The coordinates of this end point of the curve R had been calculated, and the slope of the curve R at this point had its maximum value (infinity in theory, but actually a large finite number in one numerical solution). The coordinates of the end point of the curve E were thus set equal to those calculated for the end point of curve R, while the slope of the curve E at this point was set to zero thus producing the first segment of curve E that intersects the curve R. The next point out on curve E (i.e., to the left in FIG. 1) was then approximated by finding the simultaneous solution of the reflected ray line going through the next-to-last reflected ray line and a segment of curve E whose slope is normal to that line and passes through the left end point of the first segment of curve E as calculated above. A closer approximation was obtained by averaging the coordinate position yielded by this simultaneous solution with the known position of intersection of the curves E and R. The remaining data points were obtained in the same manner, working back along the curve E (i.e., to the left in FIG. 1) until a data file was created containing coordinate (r, z) and slope values for a plurality of data points on curve E corresponding to the plurality previously calculated for the curve R.

Figure 2:
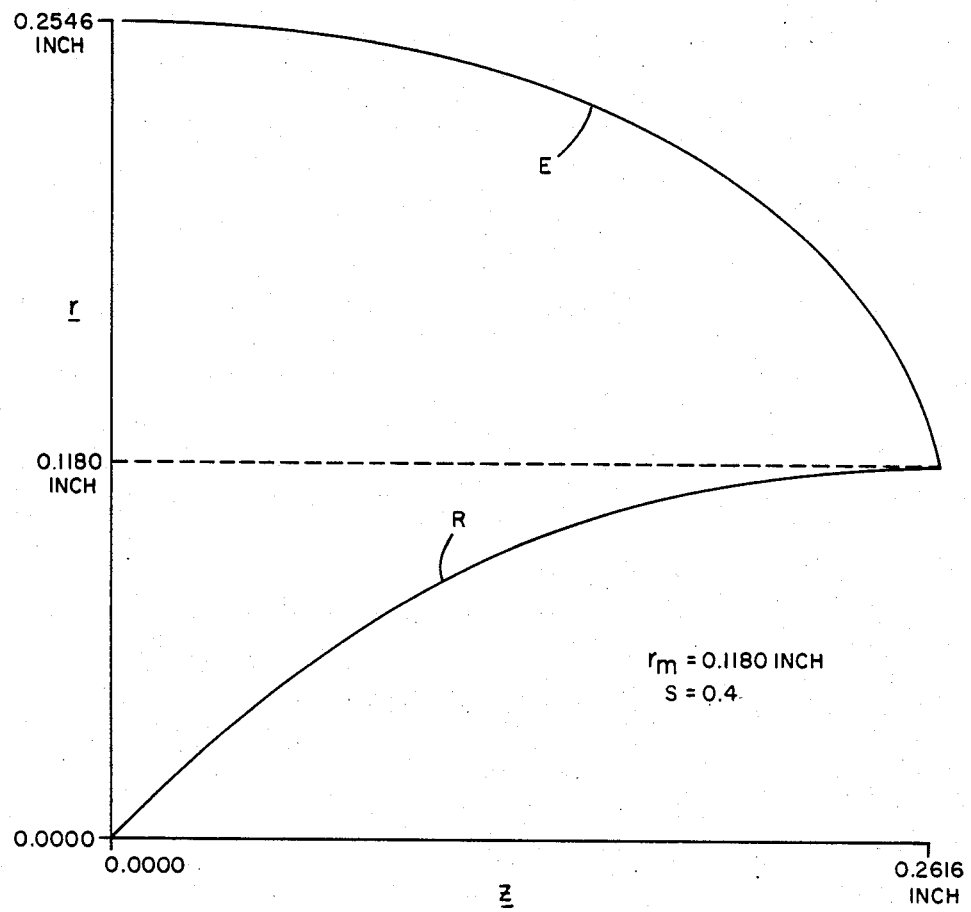
FIG. 2 is an illustration of a computer plot generated from the mathematical relation derived using FIG. 1 illustrating the respective shapes of a reflective surface and a surrounding external transmissive body surface in an optical element embodied in accordance with the invention.

An illustration of the type of computer plot generated for the curves R and E by the above-described procedures is shown in FIG. 2 for the case of an incident beam having a maximum radius $r_m$ of 0.118 inches and a Gaussian parameter s of 0.4.

The theoretical results set forth above can readily be implemented in actual elements, as discussed in the section which follows.

2. Illustrative Embodiments

Figure 3:
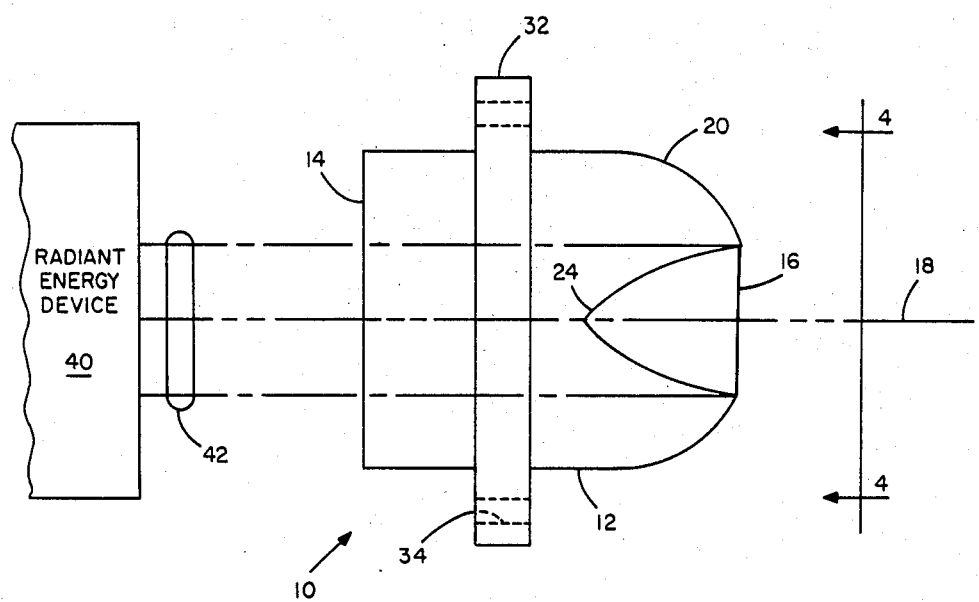
FIG. 3 is a diagrammatic side view of a first optical element embodied in accordance with the invention shown together with a radiant energy device which may be either a radiant energy source or receiver.
Figure 4:
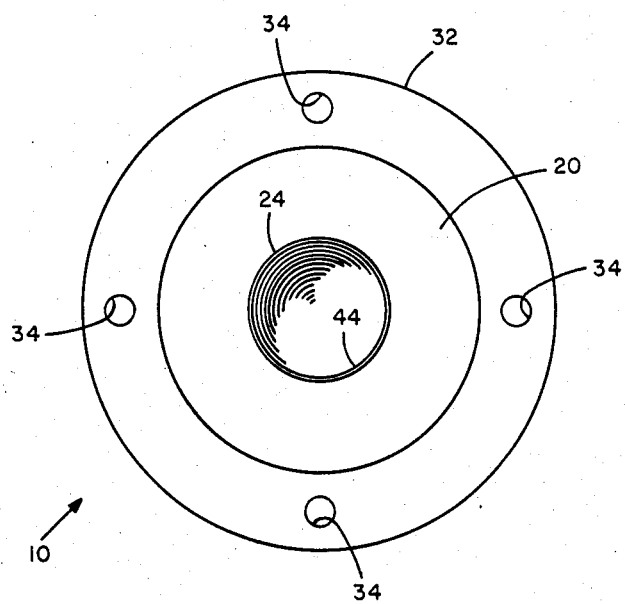
FIG. 4 is an end view of the optical element of FIG. 3 taken normal to the plane labeled 4—4 in FIG. 3.

FIGS. 3 and 4 illustrate a first optical element 10 embodied in accordance with the invention. As discussed above, the element 10 is illustratively one which will diverge an incident beam into rays substantially uniformly distributed with a $2\pi$ solid angle. The element 10 comprises a generally cylindrical body 12 of optically transmissive material which includes a first end 14, a second end 16 and an optical axis 18 extending between its first and second ends. The first end 14 of the body 12 is preferably planar and disposed normal to the axis 18, while the second end 16 of the body 12 includes a curved external surface 20. The body 12 is symmetrical with respect to the axis 18.

Formed internally of the body 12 is a metallic reflective surface 24 having the shape of an ogive, the pointed end of which is directed toward the first end 14 of the body 12. The reflective surface 24 is symmetrical with respect to the axis 18. The precise shape of the surface 24 corresponds to that which results from the rotation of a curve of the form of curve R in FIG. 2 about the axis 18.

The curved external surface 20 of the body 12 surrounds the reflective surface 24 and provides the desired normal incidence for ray lines reflected from the reflective surface 24. The precise shape of the external surface 20 corresponds to that which results from the rotation of a curve of the form of curve E in FIG. 2 about the axis 18.

A mounting flange 32 is formed integrally with the body 12 intermediate its first and second ends 14 and 16, respectively. The mounting flange 32 is disposed to the left of the curved external surface 20 of the body 12 so as not to interfere with any portion of the radiant energy beam which propagates through the element 10. As best seen in FIG. 4, the flange 32 is provided with a plurality of axial holes 34 which permit the element 10 to be mounted and aligned within an optical system.

A radiant energy device 40 is disposed adjacent the first end 14 of the element 10. In the case where the element 10 is to be used to diverge a radiant energy beam, the device 40 may comprise a radiant energy source, such as a laser, which emits a radiant energy beam 42 that is directed toward the element 10. The device 40 is aligned with respect to the optical axis 18 of the element 10 so that the beam 42 propagates along that axis. In this case, the beam 42 impinges on the reflective surface 24 which, because of its carefully selected shape, disperses the beam 42 into rays substantially uniformly distributed within a $2\pi$ solid angle. These reflected rays exit the element 10 at normal incidence to the curved external surface 20 of the body 12.

It will be appreciated that there will be some blockage of the radiant energy that emerges from the element 10 in the vicinity of the axis 18 due to the presence of the reflective surface 24 in the beam's path. Thus, in near field, that is, at distances very close to the second end 16 of the element 10, there will be a "void" in the center of the dispersed energy emerging from the element 10. In practice, however, this "void" becomes negligible at short distances from the second end 16 of the element 10, due to dispersion outside of the element 10 and to the fact that its proportional area within the hemisphere decreases with the square of the distance from the element 10.

The well known principle of ray reversability dictates that the element 10 can also be used in reverse, that is, to converge radiant energy which is incident from a hemispherical field on the curved external surface of the body 12 into a beam 42 which propagates generally parallel to the axis 18. In this latter case, the device 40 may comprise a radiant energy receiver, such as a detector, which receives the beam 42 after its passage through the element 10.

The transmissive body 12 of the element 10 can be fabricated from any of a variety of optical grade materials using conventional casting, molding and/or machining procedures. One particularly useful material for the body 12 is optical grade polymethylmethacrylate which can be readily casted in prefabricated molds. The reflective surface 24 may correspond to the external surface of a metallic (e.g., aluminum) ogive 44 (FIG. 4) which is embedded in the body 12. Alternatively, the reflective surface 24 may correspond to that of an ogival cavity formed in the second end 16 of the body 12 during its casting, which is subsequently coated with a thin metallic reflective layer 4 of gold, silver, aluminum or the like. In the case where a metallic ogive is used, its external surface should, of course, be polished to provide sufficient smoothness.

As can be appreciated from the plot of FIG. 2, the diameter and length of the element 10 need only be slightly greater than the cross-sectional diameter of the beam 42. Thus, the element 10 can be made relatively compact and small in size.

Figure 5:
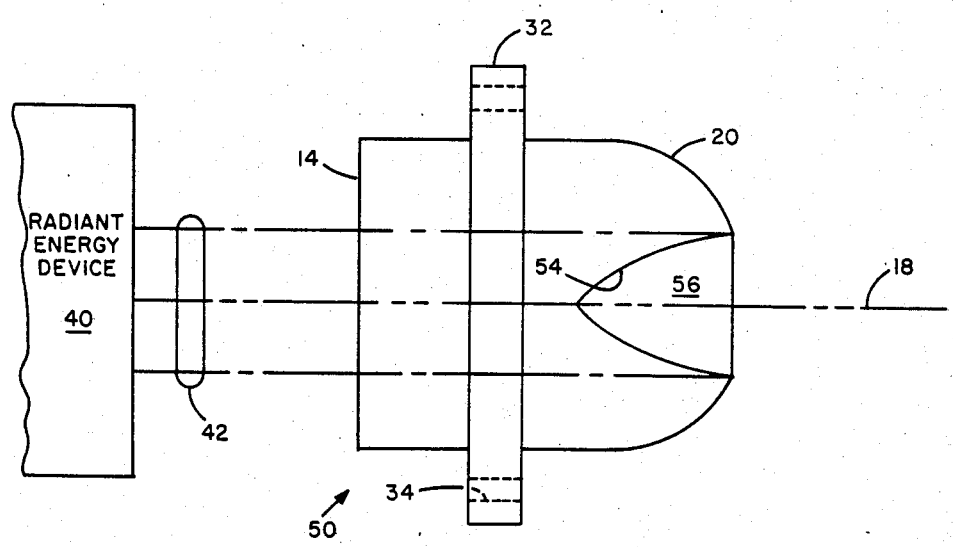
FIG. 5 is a diagrammatic side view of a second, slightly modified optical element embodied in accordance with the invention which is again shown with a radiant energy device in the form of either a source or a receiver.

FIG. 5 of the drawing illustrates a second optical element 50 embodied in accordance with the invention which relies upon the principle of total internal reflection. The parts of the element 50 which are identical to those in the element 10 previously described are labeled with identical reference numerals. In the element 50, an ogival cavity 54 is formed in the second end of the body 12. The shape of the cavity 54 corresponds to that which results from the rotation of a curve of the form of curve R of FIG. 2 about the axis 18. The index of refraction n of the body 12 exceeds the index of refraction n' of the medium 56 which occupies the cavity 54 so that each ray that is incident on the dielectric interface between the body 12 and the medium 56 at the surface 54 is subjected to total internal reflection. Since the minimum angle of incidence $\phi m$ for such rays at the cavity 54 is about 45° (i.e., for the ray which propagates closest to the axis 18 in FIG. 1), Snell's Law dictates that total internal reflection takes place if the ratio of n/n' is greater than about 1.414. In the case where the medium 56 is air (i.e., n'=1), then the index of refraction n of the body 12 need only be greater than about 1.414. Fabricating the body 12 from polymethylmethacrylate, as discussed above, which has an n of about 1.49, inherently satisfies this requirement.

The element 50 operates identically to the element 10 previously described, and includes all of its stated advantages. The element 50 further eliminates the need for the formation of a metallic member or layer within the body 12.

It should be understood that the above described embodiments are intended to illustrate the invention, and that various modifications thereto will be recognized by those skilled in the art which do not depart from the scope of the invention as defined by the appended claims. For example, while the theory has been developed for the case of a $2\pi$ solid angle of divergence with substantially uniform distribution of dispersed energy within each increment of solid angle, it could be readily modified by those skilled in the art for solid angles of divergence other than $2\pi$ and for other dispersed energy distributions. Also, while numerical solutions for the controlling surfaces have been provided, solutions in the form of algebraic expressions could also be derived. It is thus the intent of the appended claims to cover these and other modifications as come within the true scope of the invention.

What is claimed as new and desired to be secured by Letters Patent of the United States is:

1. An optical element comprising:
   A. a body of optically transmissive material having a first end, a second end and an optical axis extending between said first and second ends;
   B. a reflective surface formed internally of said body as a surface of revolution about said optical axis, said reflective surface having a shape such that a beam of radiant energy which propagates along said optical axis within said body is reflected by said reflective surface into rays substantially uniformly distributed within a predetermined solid angle measured from a plane normal to said optical axis;

C. said body having an external surface extending about said reflective surface and formed as a surface of revolution about said optical axis, said external surface having a shape such that it is disposed substantially at normal incidence to said rays reflected from said reflective surface.

2. The optical element of claim 1 in which the shape of said reflective surface corresponds to that generated by rotating a curve defined by the following relationship about said optical axis:

$$z = - \int_o^{r_m} \frac{dr}{\tan\theta/2}$$

where
- z = position along said optical axis,
- r = position orthogonal to said optical axis,
- θ = angle with respect to said optical axis of one of said rays reflected from said reflective surface at a coordinate position (r, z) on said curve, and
- $r_m$ = maximum radius of said beam of radiant energy.

3. The optical element of claim 1 in which said reflective surface is as a metallic, generally ogival member internally of said body and symmetrically disposed about said optical axis and having the apex of said ogival member pointed in the direction of the beam of radiant energy.

4. The optical element of claim 1 in which said second end of said boy defines a cavity having a cavity surface symmetrically disposed about said optical axis and shaped to correspond to the shape of said reflective surface, and in which said reflective surface is formed as a reflective metallic layer on said cavity surface.

5. The optical element of claim 1 in which said reflective surface is formed as a surface defining a cavity in said second end of said body, the material of said body having an index of refraction n and said cavity including a medium of index of refraction n' which is less than n so as to provide total internal reflection of said beam at said cavity surface.

6. The optical element of claim 1 in which said first end of said body defines a planar surface disposed normal to said optical axis.

7. The optical element of claim 1 further including element mounting means extending outwardly of said body intermediate of said first end and said external surface of said body.

8. The optical element of claim 7 in which said element mounting means is formed integrally with said body.

9. The optical element of claim 1 adapted for use in diverging a beam of radiant energy substantially uniformly into a 2π solid angle measured from a plane normal to said optical axis, and further including a source of a radiant energy beam disposed adjacent to said first end of said body so as to direct said beam into said body along said optical axis.

10. The optical element of claim 9 in which said radiant energy beam source comprises a laser source.

11. The optical element of claim 1 adapted for use in converging radiant energy incident upon said external surface of said body within a 2π solid angle measured from a plane normal to said optical axis, and further including means disposed adjacent said first end of said body for receiving the radiant energy converged by said element.

12. The optical element of claim 1 in which said body is fabricated from optical grade polymethylmethacrylate.

* * * * *